US011543029B2

(12) United States Patent
Wu et al.

(10) Patent No.: US 11,543,029 B2
(45) Date of Patent: Jan. 3, 2023

(54) PART EDGE SEAL ARRANGEMENT AND JOINING METHOD

(71) Applicant: The Boeing Company, Chicago, IL (US)

(72) Inventors: Steven Kuan-Chi Wu, Seattle, WA (US); Ian Edward Schroeder, Seattle, WA (US); Mark Edmond Shadell, Seattle, WA (US); Melissa A. Uhlman, Kirkland, WA (US); Jesse Randal Wiseman, Snohomish, WA (US); Tho Ngoc Dang, Lynnwood, WA (US); Richard Bruce Tanner, Seattle, WA (US); Melinda Dae Miller, Snohomish, WA (US); Kristopher William Talcott, Seattle, WA (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 16/800,791

(22) Filed: Feb. 25, 2020

(65) Prior Publication Data

US 2021/0262568 A1 Aug. 26, 2021

(51) Int. Cl.
*F16J 15/02* (2006.01)
*B64F 5/10* (2017.01)

(52) U.S. Cl.
CPC ............... *F16J 15/021* (2013.01); *B64F 5/10* (2017.01)

(58) Field of Classification Search
CPC .......... F16J 15/02; F16J 15/021; F16J 15/022; B64F 5/10
See application file for complete search history.

(56) References Cited

U.S. PATENT DOCUMENTS

| | | | | |
|---|---|---|---|---|
| 2,736,521 | A | 2/1956 | Bosserman | |
| 2,824,664 | A | 2/1958 | French et al. | |
| 4,068,777 | A * | 1/1978 | Humphrey | B65D 90/08 52/247 |
| 8,167,245 | B1 * | 5/2012 | Koehler | B64C 3/34 244/135 R |
| 8,900,496 | B2 | 12/2014 | Kovach et al. | |
| 9,789,971 | B2 | 10/2017 | Wiseman et al. | |
| 10,393,064 | B2 | 8/2019 | Ito et al. | |
| 2010/0107513 | A1 | 5/2010 | Buchanan et al. | |
| 2012/0276362 | A1 | 11/2012 | Denavit et al. | |

FOREIGN PATENT DOCUMENTS

| | | | |
|---|---|---|---|
| EP | 2690014 | A1 | 1/2014 |
| GB | 2144507 | A | 3/1985 |
| JP | 2002213613 | A1 | 1/2002 |

OTHER PUBLICATIONS

European Patent Office Extended Search Report, dated May 25, 2021, regarding Application No. 20212780.9, 7 pages.
European Patent Office Communication Report, dated Nov. 3, regarding Application No. 20212780.9, 5 pages.

* cited by examiner

*Primary Examiner* — Gilbert Y Lee
(74) *Attorney, Agent, or Firm* — Yee & Associates, P.C.

(57) ABSTRACT

A seal arrangement is provided for sealing an exposed edge of a composite laminate part having a fay surface configured to be joined to a structure. The seal arrangement includes a precured edge seal covering the exposed edge and a cover covering the edge seal. A seal bead located within a recess in the fay surface of the part forms a seal between the part and the structure.

33 Claims, 14 Drawing Sheets

PART EDGE SEAL ARRANGEMENT AND JOINING METHOD

BACKGROUND INFORMATION

1. Field

The present disclosure generally relates to treatments for part edges, and deals more particularly with a seal arrangement for a part edge, and a method of joining the part to a structure.

2. Background

It is sometimes desirable to seal an exposed edge of a part. For example, in the aircraft industry, structural members forming a wing box containing fuel tanks comprise carbon fiber reinforced polymer laminates. Some of these structural members may need to be cut to a desired size, resulting in cut edges in which the fibers are exposed. It is necessary to seal the cut edges in order to protect against fuel leakage, corrosion of adjacent metallic structures, and possible adverse effects of high-energy electrical charges such as those resulting from lightning strikes.

Precured seals may be applied to the cut edges of wing box components such as spars before they are attached to wing skins. However, additional sealing operations are necessary which must be performed from within the fuel tanks after the spars have been attached to the wing skins. These additional sealing operations involve the application of additional seal details as well as cleanup of seal squeeze out. Carrying out these additional sealing operations within the confined space of the fuel tank is difficult and time-consuming.

Accordingly, it would be desirable to provide an edge seal arrangement for exposed edges of a composite part that can be applied prior to joining the part to a structure, and which eliminates the need for post assembly sealing/cleanup operations.

SUMMARY

The disclosure relates in general to sealing exposed edges of fiber reinforced members, and more specifically to an edge seal arrangement that can be prepackaged as part of the edge design.

According to one aspect, a seal arrangement is provided for part having the exposed edge and a fay surface. The seal arrangement includes an edge seal covering the exposed edge, and a cover that covers the edge seal. The seal arrangement further includes a recess adjacent the fay surface and a seal bead located within the recess that is configured to form a seal between the fay surface and a structure to which the part is joined.

According to another aspect, a seal arrangement is provided for a part having an exposed edge and a fay surface. The edge seal arrangement comprises an edge seal covering the exposed edge, a cover covering the edge seal, and a seal bead configured to form a seal between the fay surface and a structure to which the part is joined.

According to another aspect, an edge seal arrangement is provided for sealing an exposed edge of a composite laminate part. The edge seal arrangement includes a polymer edge seal covering the exposed edge, and a cover that extends over and covers the edge seal.

According to a further aspect, a method is provided of joining a fay surface of a part having an exposed edge with a structure. The method includes applying an edge seal on the exposed edge of the part and installing a cover over the edge seal. The method further includes forming a recess, placing a seal bead in the recess. The method further includes bringing the fay surface of the part into contact with the structure, including forming a seal between the fay surface of the part and the structure using the seal bead.

According to still another aspect, a method is provided of joining a fay surface of a part having an exposed edge with a structure. The method comprises forming a recess in the part adjacent the fay surface, and placing a seal bead in the recess. The method further includes bringing the fay surface of the part into contact with the structure, and forcing at least a portion of the seal bead along an interface between the fay surface and the structure.

One of the advantages of the edge seal arrangement is that it may be integrated into the design of the part edge, thereby simplifying the design of the seal. Another advantage is that additional sealing operations are not required after the part has been joined to a structure. A further advantage is that, in wing box applications, the need for carrying out additional sealing and cleanup operations from within fuel tanks is eliminated. Still another advantage of the edge seal arrangement is that it forms an effective fluid seal against fluid leakage while protecting exposed edges of a cut laminate and adjacent components from the adverse effects of corrosion and high-energy electrical discharges.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
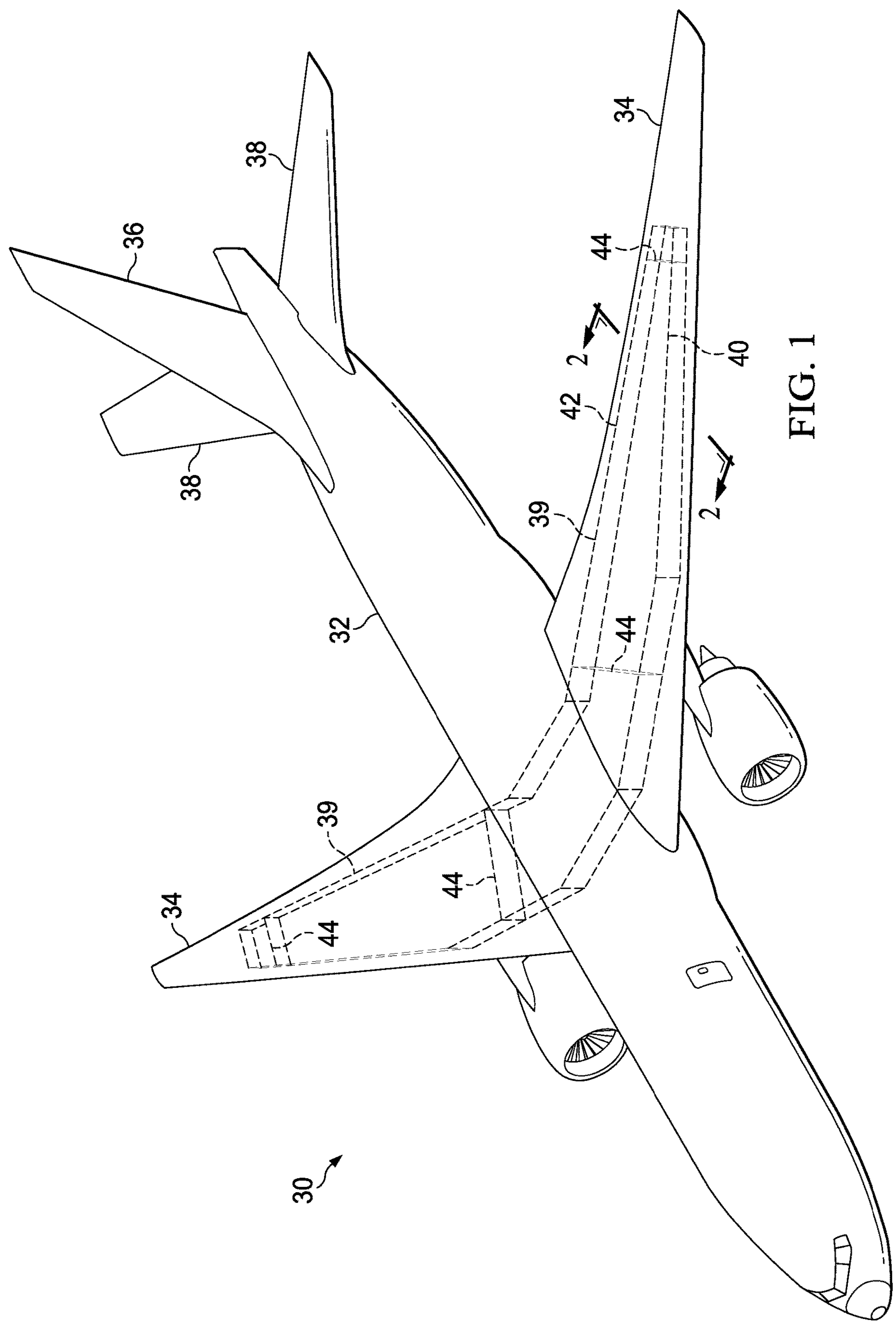
FIG. 1 is an illustration of a perspective view of an airplane, wherein wing boxes are shown in broken lines.
Figure 2:
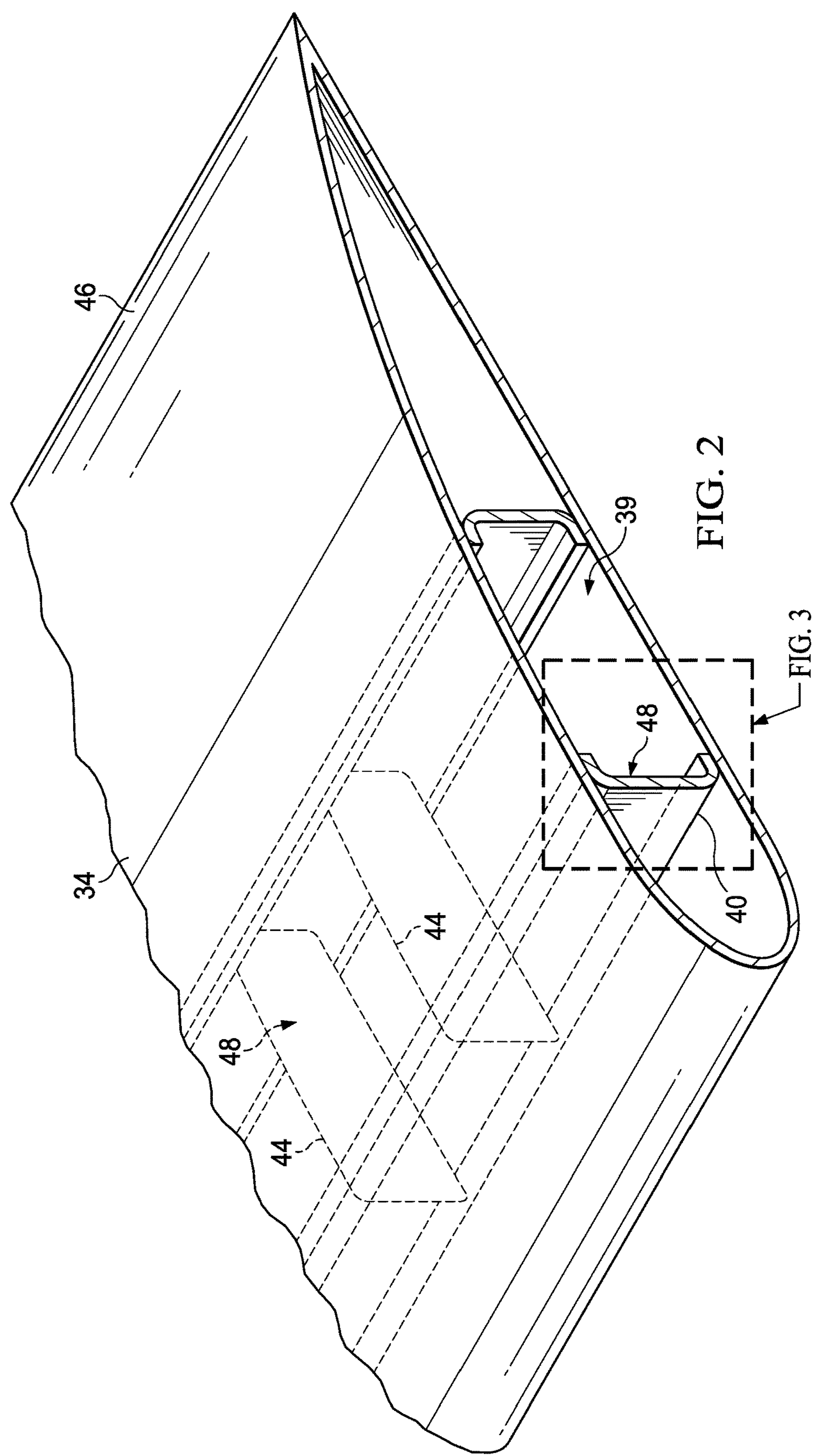
FIG. 2 is an illustration of a cross sectional view taken along the line 2-2 in FIG. 1.

Referring first to FIG. 1, the disclosed embodiments provide an edge seal arrangement that may be used to seal and protectively cover exposed edges of composite laminate parts such as those employed in the construction of an airplane 30. The airplane 30 includes a fuselage 32, wings 34, a vertical stabilizer 36 and horizontal stabilizers 38. Each of the wings 34 includes a wing box 39 formed by forward and rear spars 40, 42 respectively, connected by longitudinally extending ribs 44. Wing skins 46 are joined to both the forward and aft spars 40, 42 as well as the ribs 44. In the disclosed embodiments, the forward and rear spars 40, 42, ribs 44 and wing skins 46 are formed of a fiber reinforced plastic laminate such as carbon fiber reinforced epoxy. Any of the structural members mentioned above are parts that may have one or more edges which have been cut to a desired size or length, thereby exposing the reinforcement fibers within the laminate at these edges.

Referring now to FIGS. 2-5, the ribs 44 are spaced along the span of the wing box 39 and form one or more sealed, fluid tight chambers, which in this example comprises a fuel tank 48. As best seen in the cross sectional views of FIGS. 2 and 3, each of the spars 40, 42 has a C-shape cross-section formed by a web and a pair of flanges 58. Each of the flanges 58 includes a fay surface 62 that is joined to the wing skins 46 by bonding, co-bonding or co-curing, by a fay surface sealant, and possibly fasteners. The flanges 58 are cut to a desired length "L", creating an outer, exposed edge 54 that faces the fuel tank 48.

Figure 3:
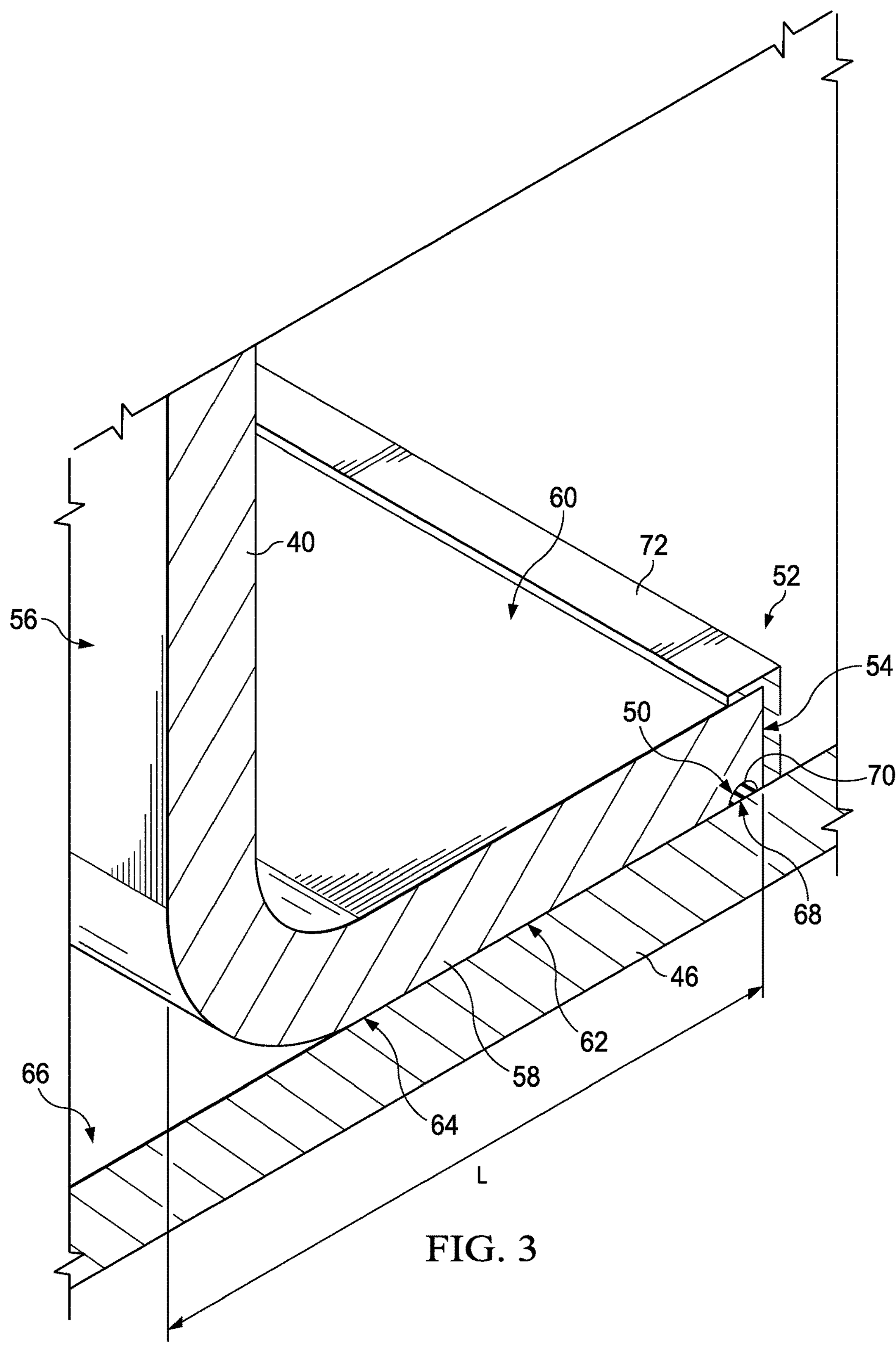
FIG. 3 is an illustration of a view of the area designated as "FIG. 3" in FIG. 2.
Figure 4:
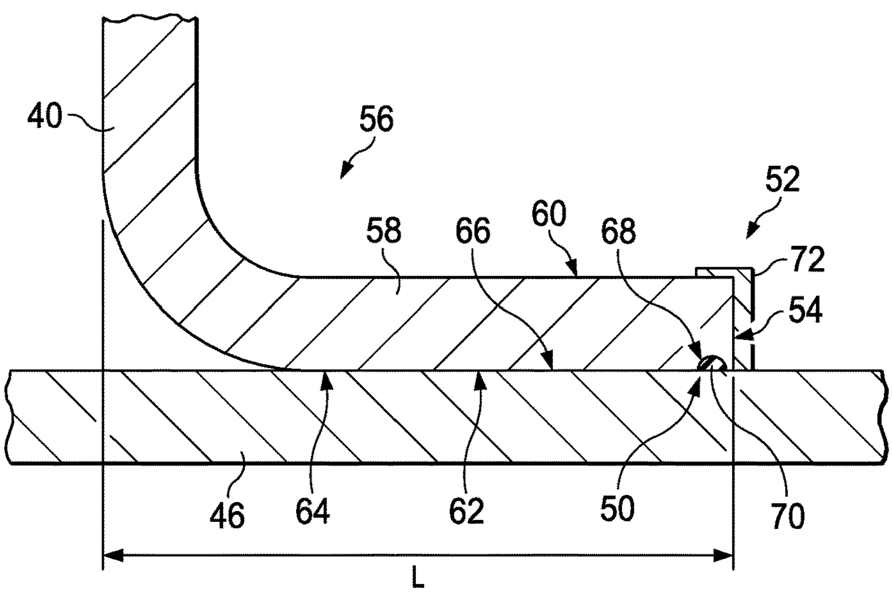
FIG. 4 is an illustration of an end view of the structure shown in FIG. 3.
Figure 5:
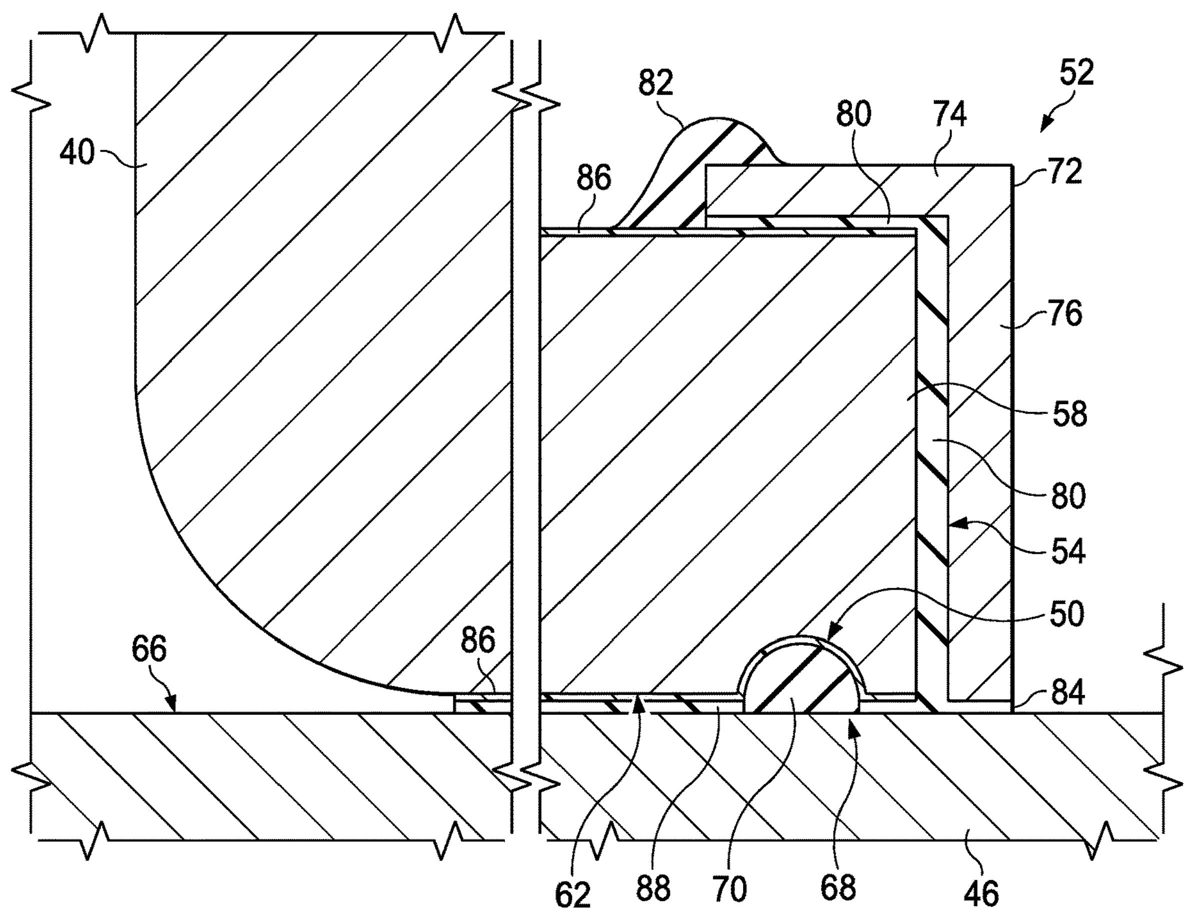
FIG. 5 is an illustration of a cross sectional view showing one example of the edge seal arrangement illustrated in FIGS. 3 and 4.

Referring particularly to FIGS. 3-5, an edge seal arrangement 52 is installed on the exposed edge 54 of a part 56 such as the spar 40, prior to joining the spar 40 to the wing skin 46. The edge seal arrangement 52 is pre-packaged with and integrated into the part 56, effectively presealing the exposed edge 54 before the spar 40 is assembled with other components of the wing box 39 and joined to the wing skin 46. Efficient prepackaging of the edge seal arrangement 52 into the part 56 may reduce production flow times while also satisfying the requirement for sealing and protecting against the effects of high energy electrical discharges. The exposed edge 54 may be a rough as-manufactured edge, or may be the result of the flanges 58 having been trimmed or cut to a desired length that is suitable for the application. In those applications where the edge seal arrangement 52 is applied over rough, as-manufactured exposed edges, edge trimming is eliminated thereby further contributing to increased production efficiency. After the spar 40 is joined to the wing skin 46, the edge seal arrangement 52 forms a fluid tight seal between the fay surface 62 of the flange 58 and the inside surface 66 (inner mold line) of the wing skin 46. The edge seal arrangement 52 also protectively covers the exposed edge 54 without the need for applying additional sealants, or performing cleanup operations from inside the fuel tank 48.

The edge seal arrangement 52 comprises an edge seal 80 (FIG. 5), an edge cover 72 and a seal bead 70 located within a recess 50. The edge seal 80 may comprise a suitable polymer sealant such as a high temperature, low density polysulfide that is applied in a wet, uncured state by any suitable technique, such as by molding in-situ. The edge seal 80 is applied directly to the exposed edge 54, and in this example, extends over onto the top surface 60 of the flange 58. The edge cover 72 may be a preformed member comprising any material suitable for the application, such as, for example and without limitation, nylon or polysulfide using a suitable manufacturing technique, such as 3D printing. In this example, the edge cover 72 has an L-shaped cross-section, comprising an upper leg 74 that covers a portion of the top surface 60 of the flange 58, and a middle leg 76 that covers the exposed edge 54. The edge seal 80 is interposed between the flange 58 and the upper and middle legs 74, 76 of the edge cover 72. Thus, the edge cover 72 overlies the entire area of edge seal 80, protectively covering the edge seal 80 during handling, transport and curing operations until the edge seal 80 has been cured, prior to joining the spars 40, 42 to the wing skins 46. The edge seal 80 may function as an adhesive that assists in holding the edge cover 72 on the spar 40 until the spar 40 is joined to the wing skin 46. However, in some examples, other suitable means may be used to hold the edge cover 72 on the spar 40 until the spar 40 is joined to the wing skin 46.

In the example shown in FIGS. 3-5, the recess 50 comprises a groove 68 having a generally semicircular cross-sectional shape formed in the fay surface 62 of the flange 58. However, the recess 50 may have other cross-sectional shapes, depending upon the application, and the shape of the seal bead 70. The groove 68 is located relatively close to the exposed edge 54 for reasons that will be explained later. A top seal 82, also formed of a suitable sealant such as low density polysulfide, may be applied at the junction between the upper leg 74 of the edge cover 72 and the top surface 60 of the flange 58 in order to protect against possible fluid leakage at this location. As will be explained later, prior to joining the spars 42 to the wing skins 46, a fay surface seal 88 may be applied between the inner surface 66 of the wing skin 46 and the fay surface 62 of the flange 58, however in some applications, a fay surface seal 88 may not be necessary.

Figure 6:
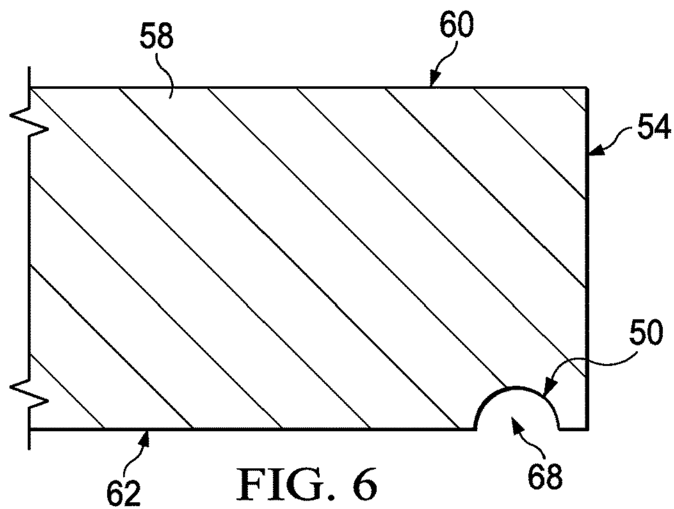
FIGS. 6-12 are illustrations of vertical cross-sectional views showing the successive steps used to produce the edge seal arrangement shown in FIGS. 3-5.
Figure 7:
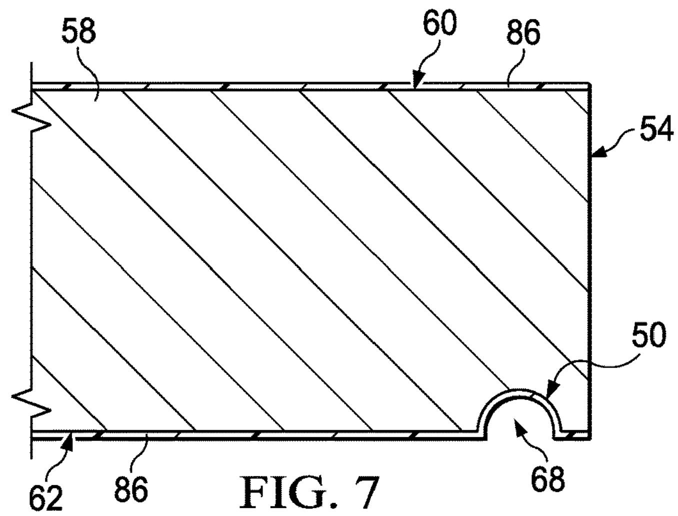
Figure 8:
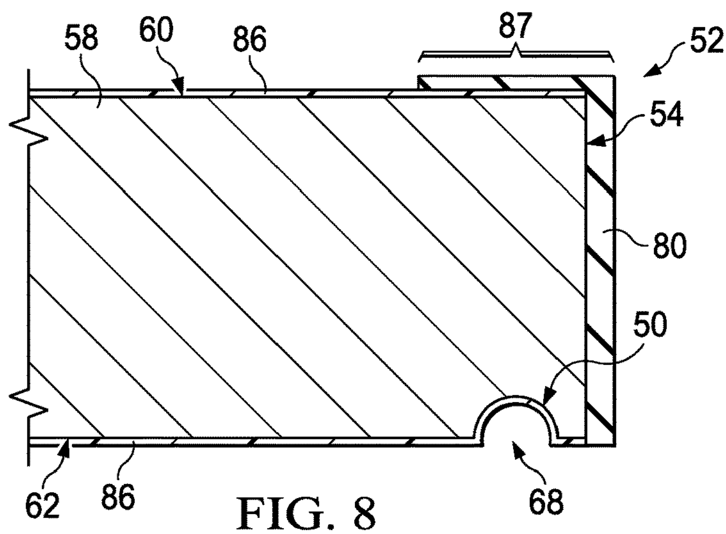
Figure 9:
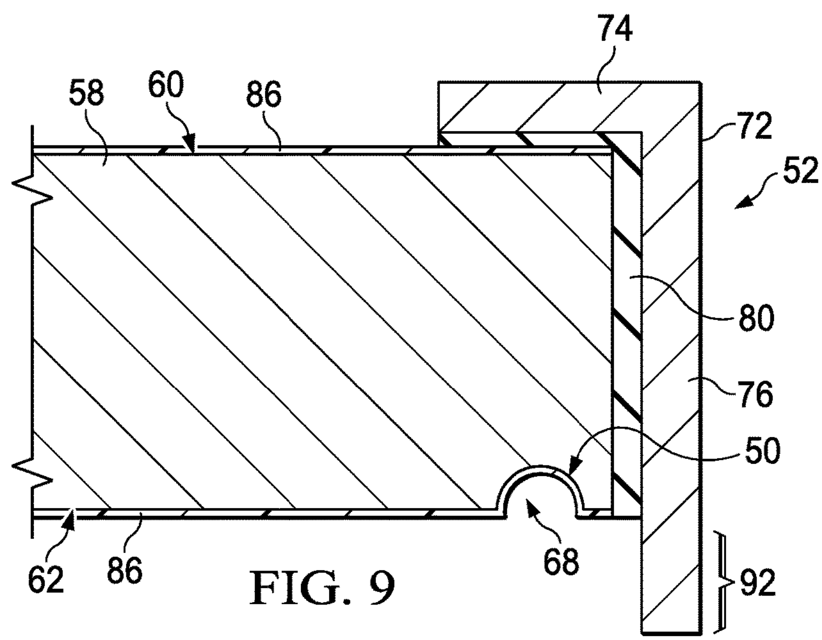
Figure 10:
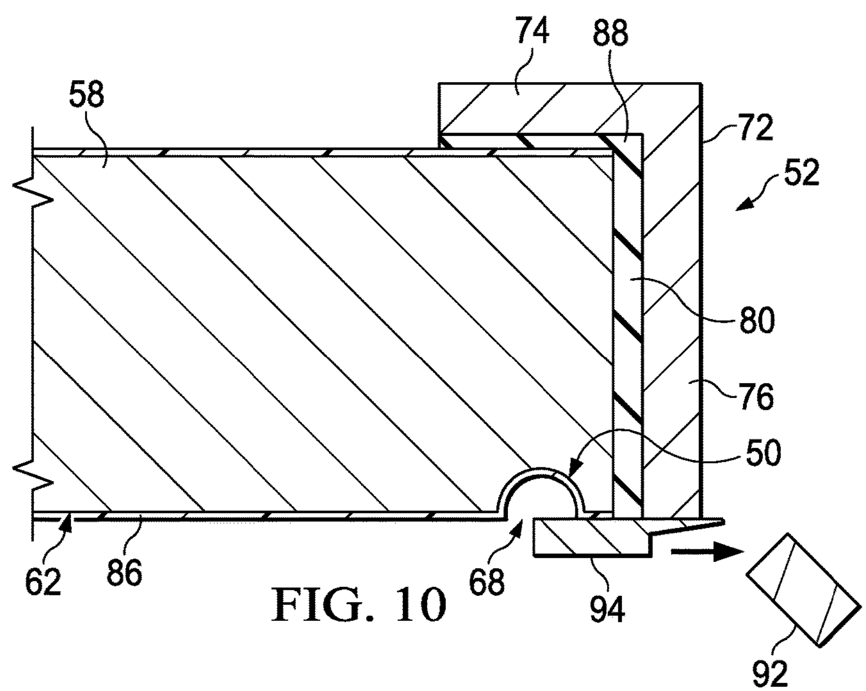

Attention is now directed to FIGS. 6-12 which illustrate one example of a method forming the edge seal arrangement 52 described above. Referring first to FIG. 6, a groove 68 is formed in the fay surface 62 of the flange 58, relatively close to the exposed edge 54. Optionally, as shown in FIG. 7, a suitable primer 86 such as an epoxy coating, may be applied to both the top surface 60 and the fay surface 62 of the flange 58. Next, as shown in FIG. 8, the edge seal 80 is applied to the exposed edge 54 and to a portion 87 (FIG. 8) of the top surface 60 of the flange 58. The edge cover 72 is then applied over the edge seal 80 as shown in FIG. 9. Depending on the length of the middle leg 76 of the edge cover 72, an excess length 92 may be present that requires removal. As shown in FIG. 10, the excess length 92 may be removed using any suitable cutting device 94 and/or cutting method.

Figure 11:
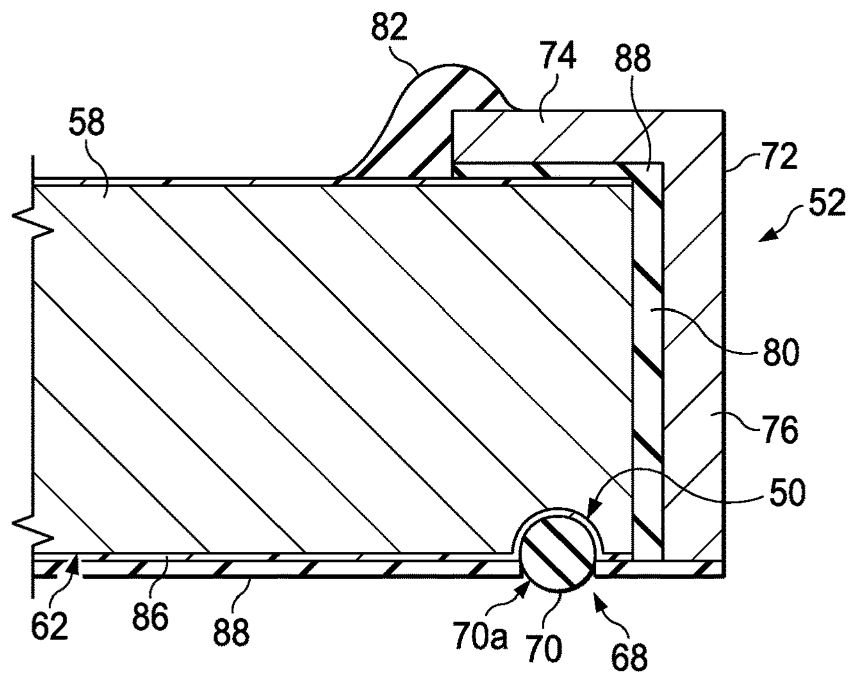

Referring to FIG. 11, the seal bead 70 is introduced into the groove 68 by any suitable technique such as by extrusion, and may be held in place until fully cured by any suitable means. The seal bead 70 has a cross-sectional area (in this example, the diameter) that is greater than the cross-sectional area of the groove 68, consequently, a portion 70*a* of the seal bead 70 extends below the bottom of the groove 68. As will become later apparent, this exposed portion 70*a* of the seal bead 70 deforms and spreads along the interface 64 between the fay surface 62 and the wing skin 46 when the spar 40 is joined to the wing skin 46. In those examples where the seal bead 70 is in an uncured state when the spar to wing skin joining process occurs, the seal bead 70 spreads along the interface 64 when the spar 40 and wing skin 46 are forced together and is later cured to form a seal. In examples where the seal bead 70 is precured, the cured seal bead 70 deforms in response to an applied spar to wing skin joining force, filling at least a portion any space that may be present along the interface 64 between the fay surface 62 and the wing skin 46. Depending on the application, a fay surface seal 88 may be applied to the fay surface 62. The top seal 82 may be applied using any suitable equipment such as an extruder (not shown).

Figure 12:
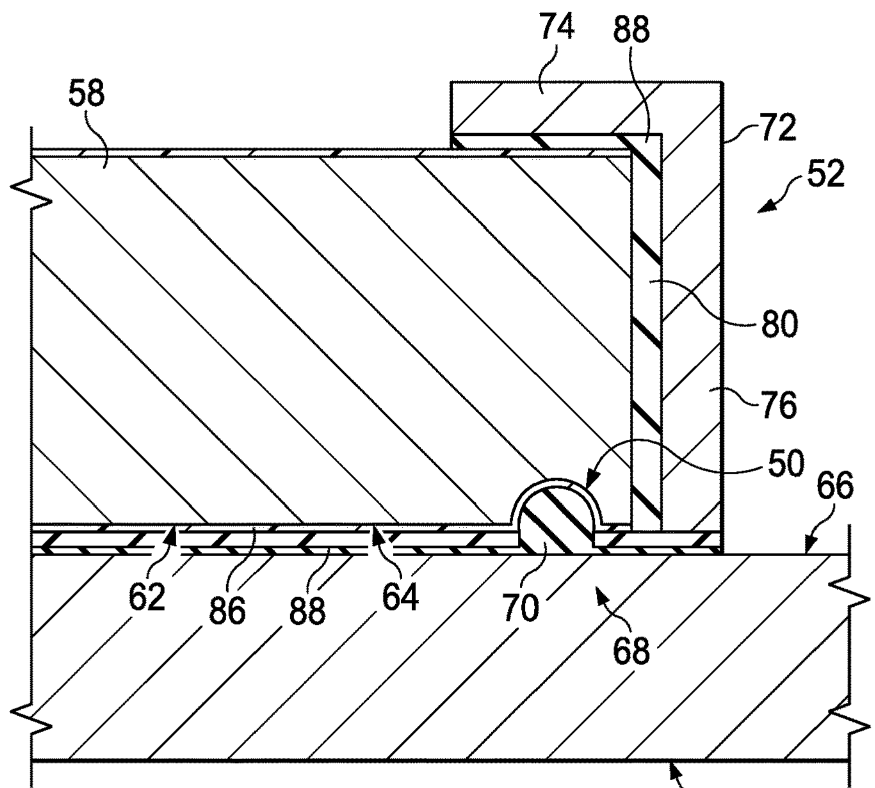

At this point, the spar 40 may be placed in an autoclave or oven in order to cure the edge seal 80, top seal 82 and seal bead 70. Following this curing process, the spar 40 may be handled and transported, during which the precured polymer edge seal 80 remains protected by the edge cover 72 from potentially damaging impacts or scraping. Referring to FIG. 12, as the spar 40 is placed on the wing skin 46, the seal bead 70 is compressed, causing it to squeeze out along the interface 64 between the fay surface 62 and the wing skin 46. A portion of the seal bead 70 also may squeeze into and fill any gap 84 that may be present between the edge cover 72 and the wing skin 46. Although the seal bead 70 may be cured prior to assembling the spar 40 and the wing skin 46 as described above, in other examples, the seal bead 70 and related squeeze out may be cured after the spar 40 and wing skin 46 are assembled together.

Figure 13:
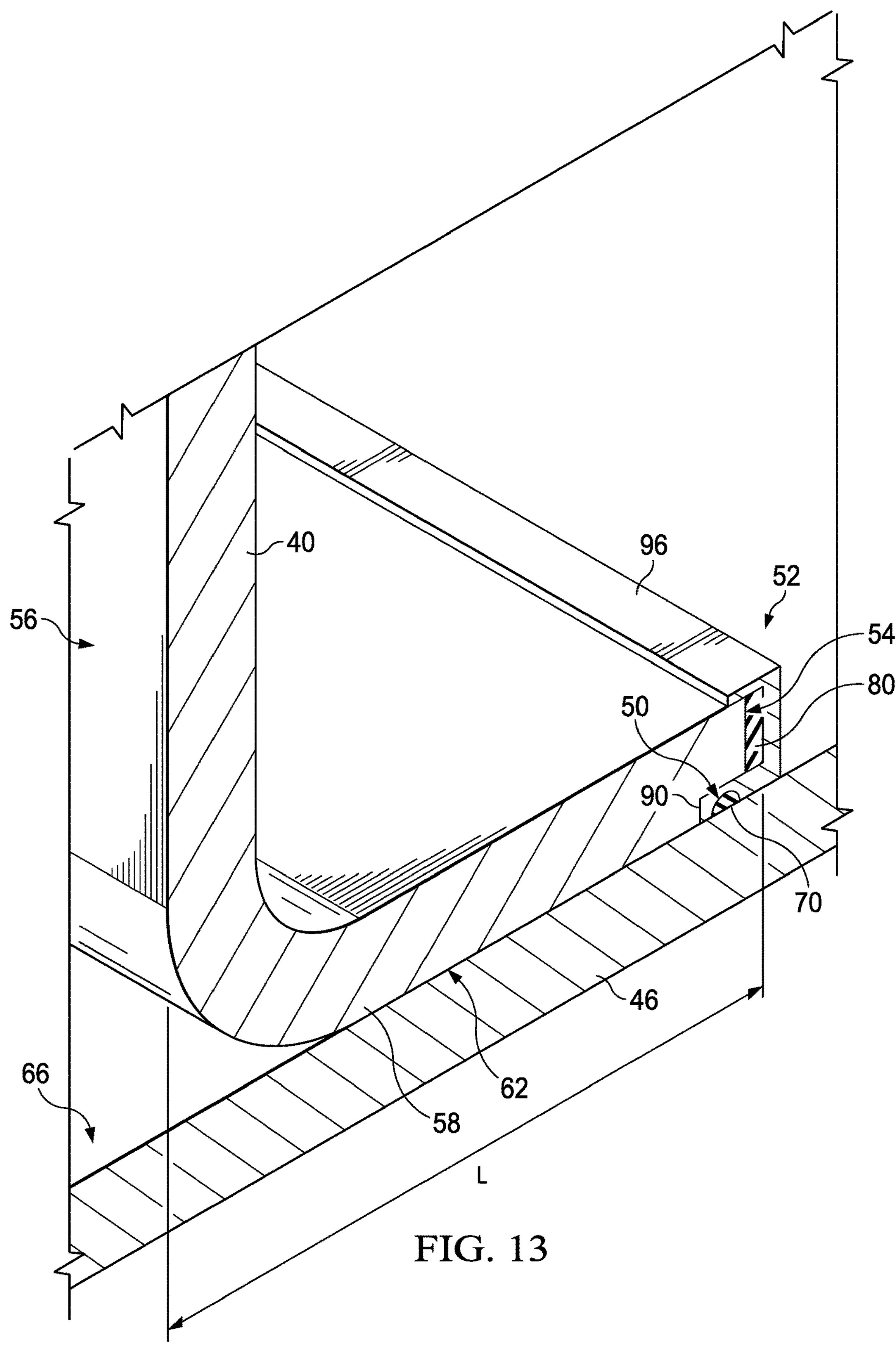
FIG. 13 is an illustration similar to FIG. 3 but showing another example of the edge seal arrangement.
Figure 14:
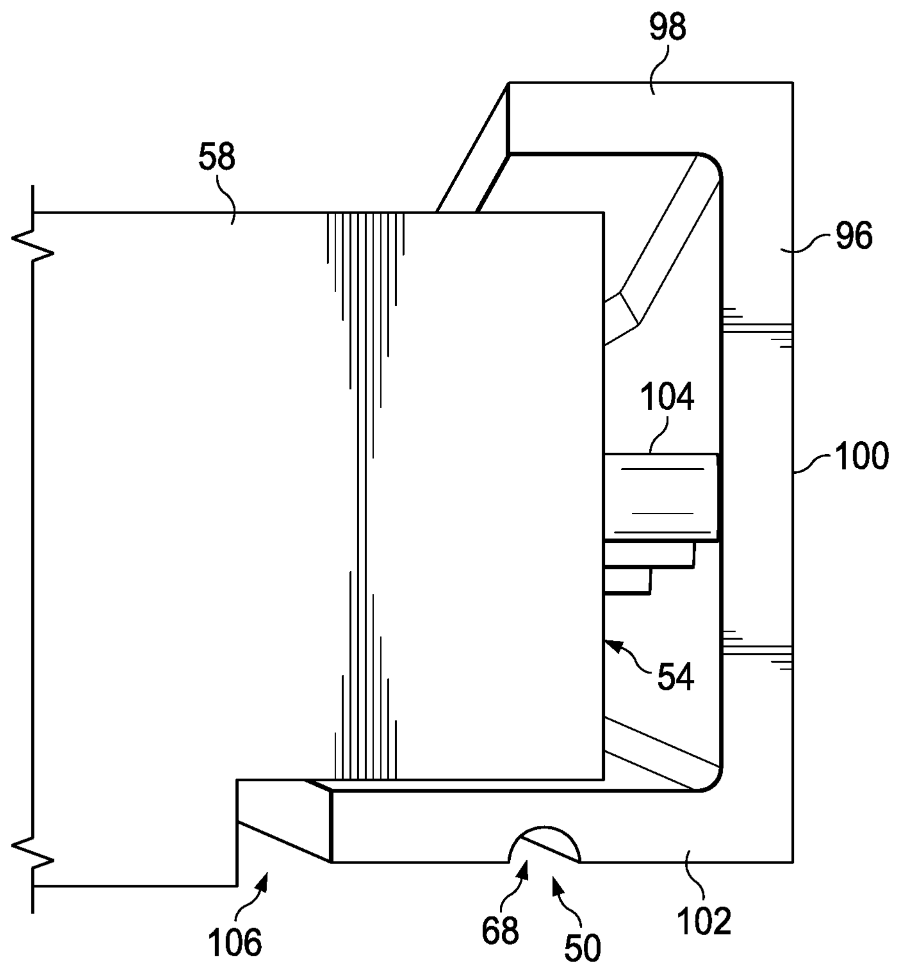
FIG. 14 is an illustration of a perspective view of the edge seal arrangement shown in FIG. 13, an edge seal and seal bead not shown for clarity.
Figure 15:
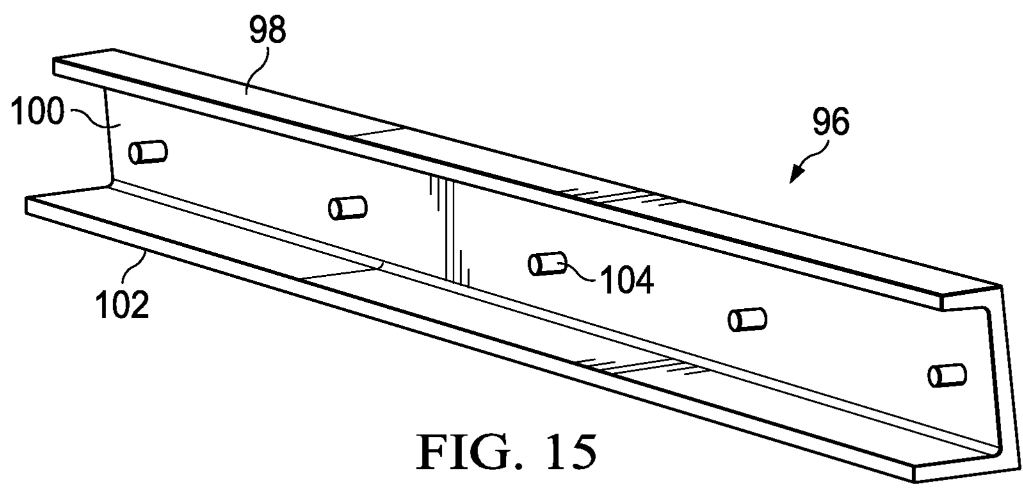
FIG. 15 is an illustration of a perspective view of the cover forming part of the edge seal arrangement shown in FIGS. 13 and 14.
Figure 16:
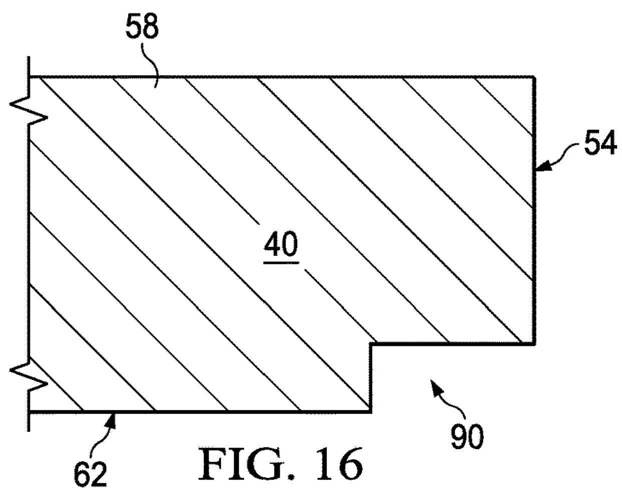
FIGS. 16-20 are illustrations of vertical, cross-sectional views showing the successive steps used to produce the edge seal arrangement of FIG. 13.

Attention is now directed to FIGS. 13-15 which illustrate another example of an edge seal arrangement 52. In this example, an edge cover 96 has a generally C-shaped cross-section formed by a top leg 98, middle leg 100 and lower leg 102. The middle leg 100 may be provided with a series of longitudinally spaced-apart standoffs 104 which function to maintain a desired spacing between the middle leg 100 and the exposed edge 54, substantially equal to the thickness "T" (see FIG. 17) of the edge seal 80 covering the exposed edge 54. The spacing created by the standoffs 104 also allow the edge seal 80 to spread as necessary to achieve a thickness "T" with the desired uniformity. The lower leg 102 of the edge cover 96 is received within a notch 90 in the bottom of the flange 58, adjacent to the exposed edge 54. The end of the lower leg 102 of the edge cover 96 is spaced from an end of the notch 90 to form a gap 106. In this example, a recess 50 comprising a groove 68 is formed in the lower leg 102 of the edge cover 96. As will become apparent from the subsequent description, an edge seal 80 is applied over the exposed edge 54 and wraps around the flange 58, while also filling the gap 106 (see FIG. 19).

Figure 17:
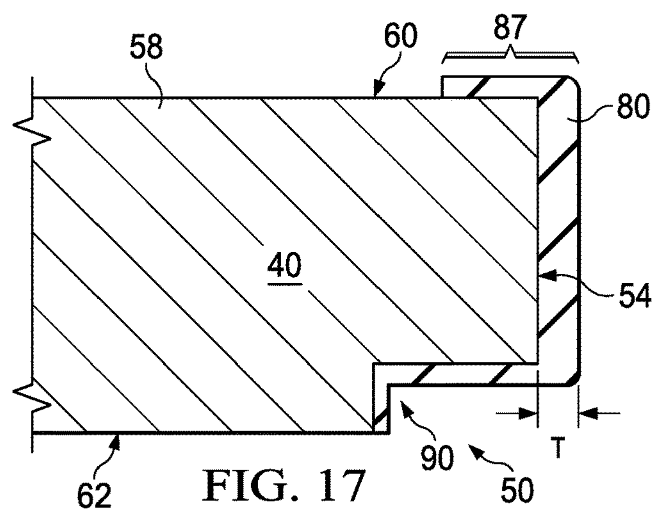
Figure 18:
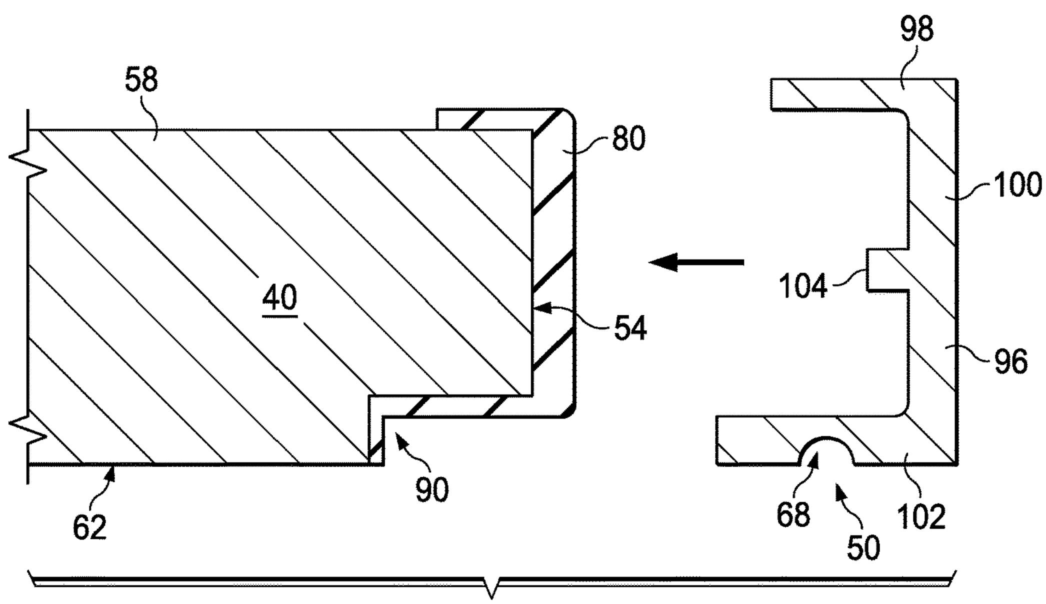
Figure 19:
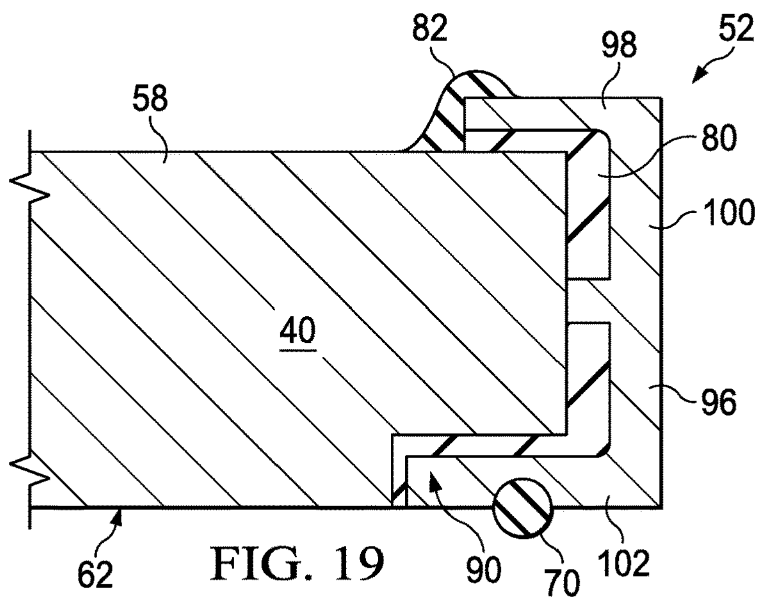
Figure 20:
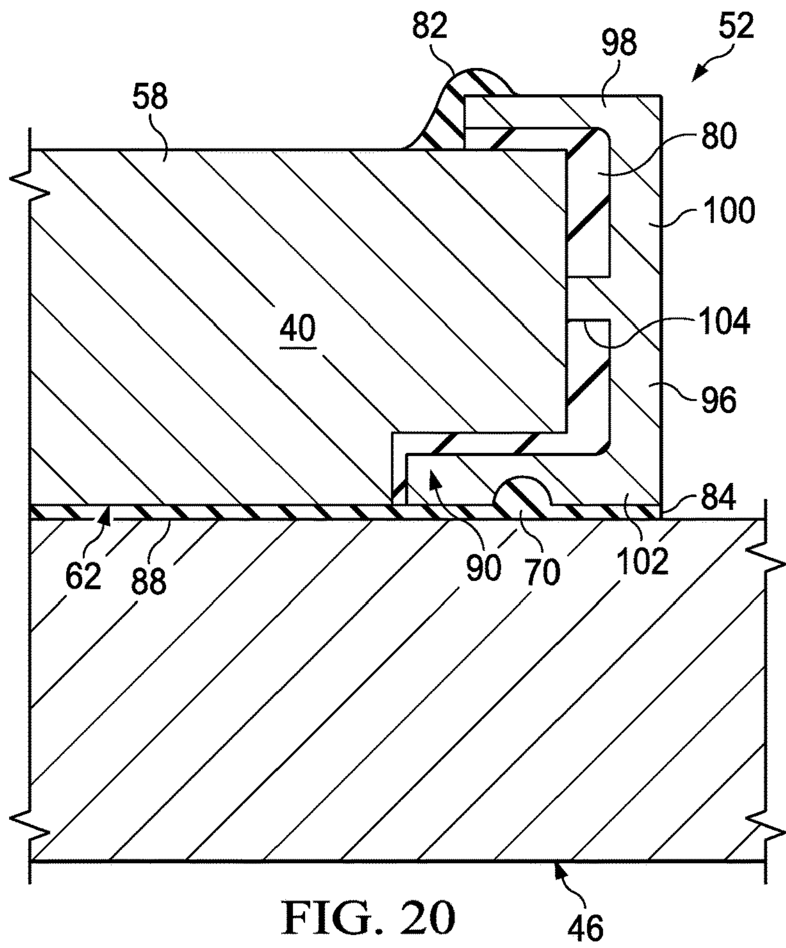

Attention is also now directed to FIGS. 16-20, which illustrate the successive steps of a method of installing an edge seal arrangement over an exposed edge 54 of a part, such as the flange 58 of spar 40. Beginning with FIG. 16, a notch 90 is formed by any suitable sawing or cutting technique, in the bottom of the flange 58 adjacent the exposed edge 54. Alternatively, the notch 90 may be formed as part of the production of the spar 40, for example using a layup and cure mandrel (not shown). Then, as shown in FIG. 17, and edge seal 80 is applied to the exposed edge 54 as well as to a portion 87 of the top surface 60 of the flange 58, and over the surfaces of the flange 58 forming the notch 90. The edge seal 80 adheres to the exposed edge 54 by virtue of its inherent adhesive properties, however in some examples it may be desirable to use an adhesive (not shown) to adhere the edge seal 80 to the exposed edge 54. Next, as shown in FIG. 18, the edge cover 96 shown in FIGS. 14 and 15 is applied over the edge seal 80 and is held in place by any suitable means, such as clamps (not shown). After installation of the edge cover 96 as shown in FIG. 19, a top seal 82 is applied at the juncture between the top leg 98 of the edge cover 96 and the top surface 60 of the flange 58. At this point, a seal bead 70 is installed in the groove 68 and held in place by any suitable means, such as tape or the like.

Next, in one example, the edge seal arrangement 52 may be installed on or laid up with a spar 40 that is uncured, in which event the spar 40 having the edge seal arrangements 52 installed on exposed edges of the flanges 58 is placed in an autoclave or oven where the edge seals 80, seal beads 70 and top seals 82 are co-cured along with the spar 40. In other examples, the edge seal arrangement 52 may be installed on a cured spar 40 before the spar 40 is joined to the wing skin 46, following which the edge seals 80, seal beads 70 and top seals 82 are cured by any suitable means prior to the spar 40 being joined to the wing skin 46. In still other examples, the edge seals 80, seal beads 70 and top seals 82 may be cured after the spar 40 is joined to the wing skin 46. In any case, the spar 40 may be installed on and joined to the wing skin 46 by bonding, co-bonding or co-curing. As the spar 40 is placed on a wing skin 46 (FIG. 20), the seal bead 70 is squeezed and caused to spread laterally along the interface 64 between the fay surface 62 and the wing skin 46, as well as into any gap 84 that may be present between the bottom of the edge cover 96 and the wing skin 46.

Figure 21:
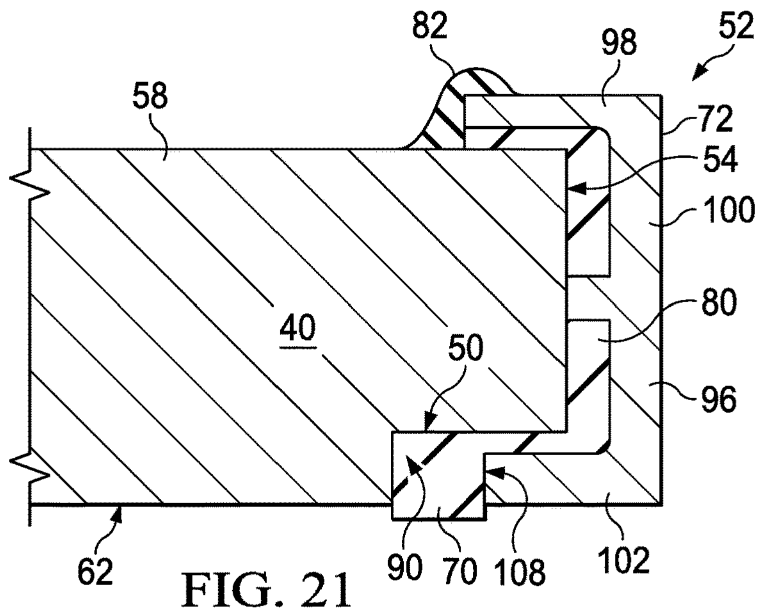
FIG. 21 is an illustration of a cross-sectional view of another example of the edge seal arrangement.
Figure 22:
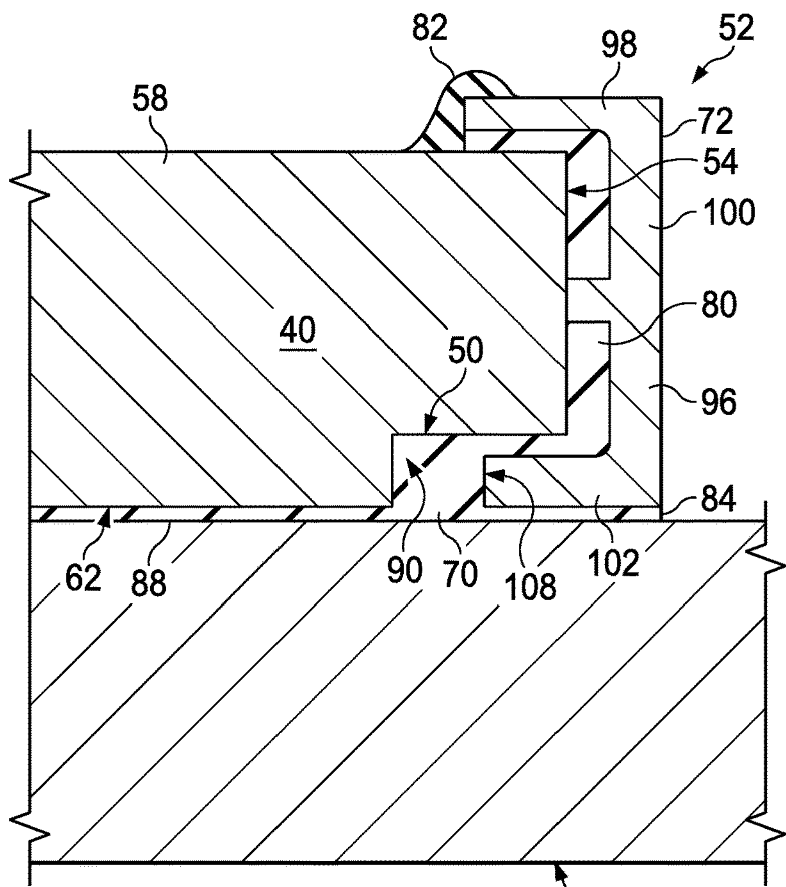
FIG. 22 is an illustration similar to FIG. 21, but showing the spar having been joined to a wing skin.

FIG. 21 illustrates a further example of the edge seal arrangement 52 similar to that shown in FIG. 19. However, in this further example, the lower leg 102 is shortened to create a generally rectangular recess 50 at the end 108 of the lower leg 102. A generally rectangular seal bead 70 is placed in a rectangular recess 50, a portion of which extends below the fay surface 62. As shown in FIG. 22, during joining of the spar 40 to the wing skin 46, the seal bead 70 spreads along the interface 62, and also fill any gap 84 that might be present between the bottom of the edge cover 72 and the wing skin 46.

Figure 23:
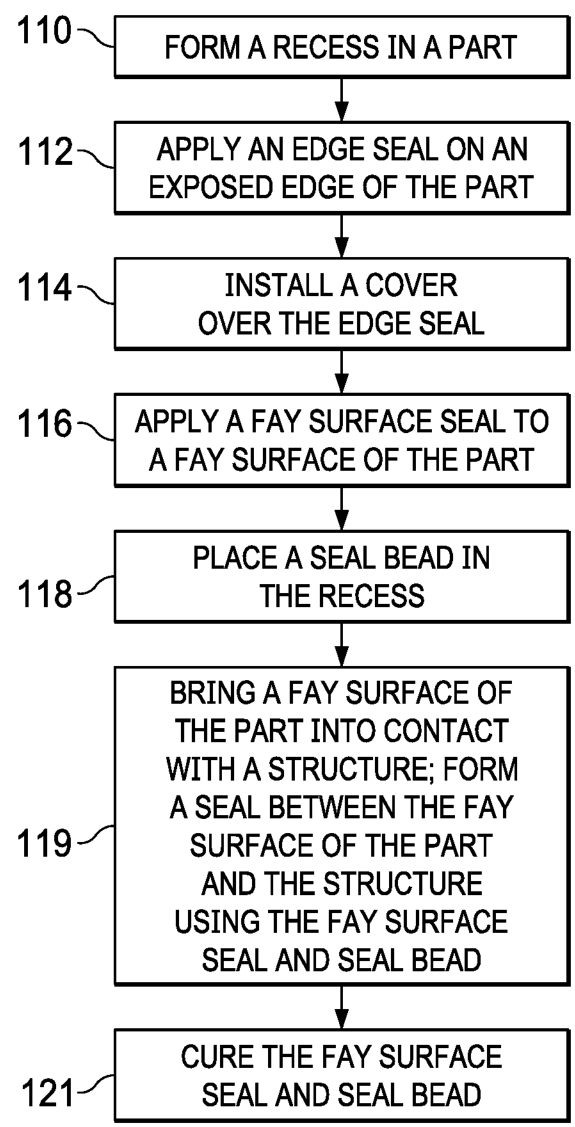
FIG. 23 is an illustration of a flow diagram of a method of joining a part having an exposed edge to a structure.

FIG. 23 broadly illustrates the steps of a method of joining a part, such as a spar 40, 42 having an exposed edge 54 with a structure such as a wing skin 46. Beginning at 110, a recess 50 is formed in a fay surface 62 of a part such as a spar 40, 42. At 112, an edge seal 80 is applied to an exposed edge 54 of the part. At 114, an edge cover 72 is installed over the edge seal 80. In one example, the recess 50 may be formed in the edge cover 72 rather than in the fay surface 62. At 116, a fay surface seal 88 is applied to the fay surface 62 of the part. At 118, a seal bead 70 is placed in the recess 50. In some examples, however, the fay surface seal 88 may be applied to the fay surface 62 after the seal bead 70 is placed in the recess 50, providing that the seal bead is not deformed or otherwise disturbed during installation of the fay seal 62. At 119, the fay surface 62 of the part is brought into contact with a structure such as the wing skin 46, resulting in a seal being formed between the fay surface 62 of the part and the structure. At 121, the fay surface seal 88 and the seal bead 70 are cured.

Figure 24:
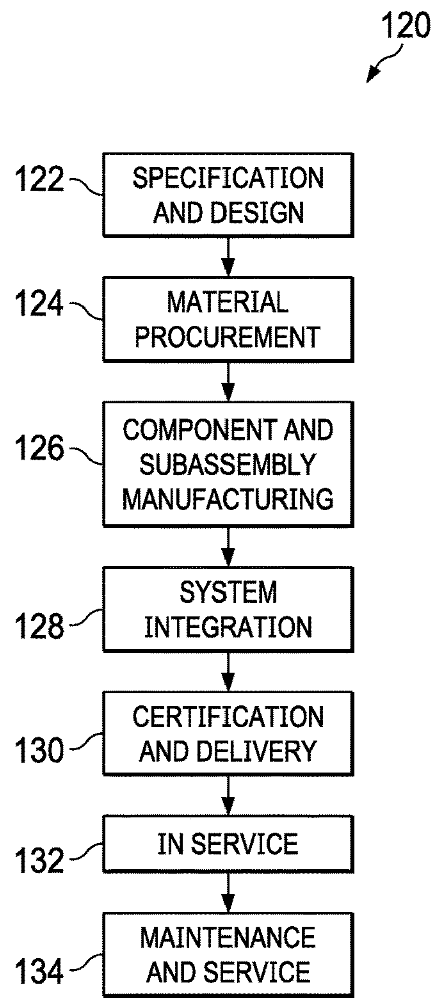
FIG. 24 is an illustration of a flow diagram of aircraft production and service methodology.
Figure 25:
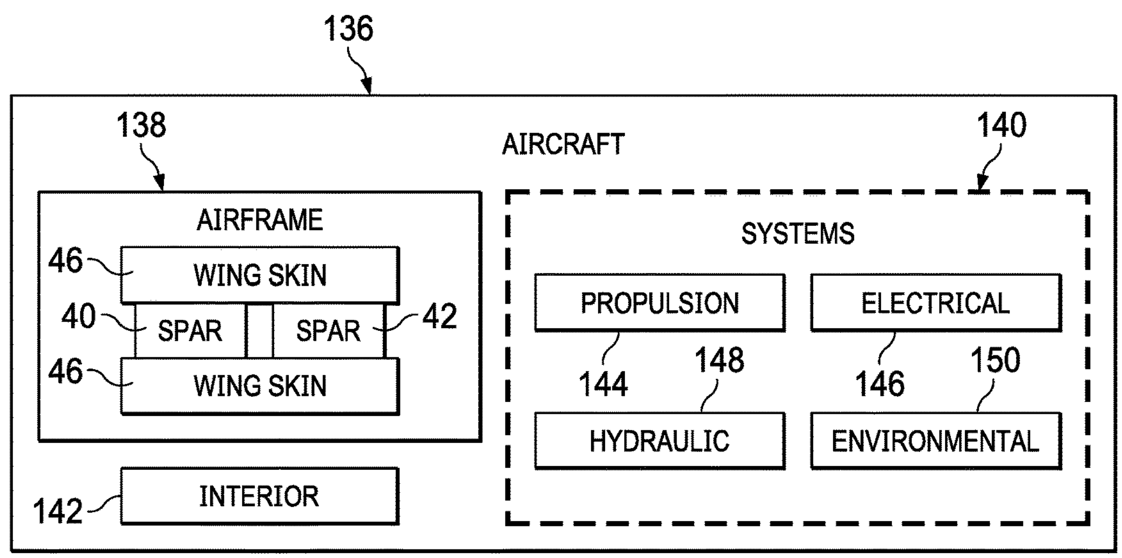
FIG. 25 is an illustration of a block diagram of an aircraft.

Examples of the disclosure may find use in a variety of potential applications, particularly in the transportation industry, including for example, aerospace, marine, automotive applications and other application where composite laminate structural parts may be used that have exposed edges. Thus, referring now to FIGS. 24 and 25, examples of the disclosure may be used in the context of an aircraft manufacturing and service method 120 as shown in FIG. 24 and an aircraft 136 as shown in FIG. 25. Aircraft applications of the disclosed examples may include a variety of fiber reinforced composite laminate structural members having one or more exposed or cut edges that must be sealed. During pre-production, exemplary method 120 may include specification and design 122 of the aircraft 136 and material procurement 124. During production, component and subassembly manufacturing 126 and system integration 128 of the aircraft 136 takes place. The disclosed seal arrangement and related method may be used as part of steps 126, 128 and 134. Thereafter, the aircraft 136 may go through certification and delivery 130 in order to be placed in service 132. While in service by a customer, the aircraft 136 is scheduled for routine maintenance and service 134, which may also include modification, reconfiguration, refurbishment, and so on.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 136 produced by exemplary method 120 may include an airframe 138 with a plurality of systems 140 and an interior 142. The airframe 138 may include front and rear wing spars 40, 42 respectively, each having exposed edges. The spars 40, 42 are joined to wing skins 46. Each of the spars 40, 42 is joined to a wing skin 46. Examples of high-level systems 140 include one or more of a propulsion system 144, an electrical system 146, a hydraulic system 148 and an environmental system 150. Any number of other systems may be included. Although an aerospace example is shown, the principles of the disclosure may be applied to other industries, such as the marine and automotive industries.

Systems and methods embodied herein may be employed during any one or more of the stages of the manufacturing and service method 120. For example, components or subassemblies corresponding to production process 126 may be fabricated or manufactured in a manner similar to components or subassemblies produced while the aircraft 136 is in service. Also, one or more apparatus examples, method examples, or a combination thereof may be utilized during the production stages 126 and 128, for example, by substantially expediting assembly of or reducing the cost of an aircraft 136. Similarly, one or more of apparatus examples, method examples, or a combination thereof may be utilized while the aircraft 136 is in service, for example and without limitation, to maintenance and service 134.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A seal arrangement for a part configured to be joined to a structure, the part having an exposed edge facing a fluid tight chamber, a top surface, and a fay surface opposite the top surface, the seal arrangement comprising:

an edge seal in direct contact with the exposed edge, the edge seal covering the exposed edge and a portion of the top surface;

a cover covering the edge seal, the exposed edge, and another portion of the top surface;

a recess located in the fay surface of the part or located in a portion of the cover positioned in a notch in the fay surface of the part; and a seal bead located within the recess and configured to form a seal between the fay surface and the structure to which the part is joined.

2. The seal arrangement of claim 1, wherein the edge seal is a precured polymer.

3. The seal arrangement of claim 1, wherein the seal bead has a cross-sectional area that is greater than a cross-sectional area of the recess, such that a portion of the seal bead extends outside of the recess and is forced between the cover and the structure when the part is joined to the structure.

4. The seal arrangement of claim 1, wherein the seal arrangement is configured to be integrated into the part before the part is joined with the structure.

5. The seal arrangement of claim 1, wherein:

the notch in the fay surface of the part is adjacent the exposed edge.

6. The seal arrangement of claim 1, wherein:

the cover overlaps the top surface, the exposed edge, and the fay surface.

7. The seal arrangement of claim 1, further comprising:

a top seal applied at the junction between an upper leg of the cover and the top surface of the part.

8. The seal arrangement of claim 1, further comprising:

a fay surface seal applied to the fay surface and the seal bead.

9. The seal arrangement of claim 1, wherein the cover further comprises:

an "L-shaped" cross-section including an upper leg that covers the another portion of the top surface of the part; and a middle leg that covers the exposed edge.

10. The seal arrangement of claim 1, wherein the cover further comprises:

a "C-shaped" cross-section including a top leg that covers the another portion of the top surface of the part;

a middle leg that covers the exposed edge; and a lower leg that covers a portion of the fay surface.

11. The seal arrangement of claim 1, wherein the cover includes standoffs configured to engage the exposed edge and maintain a desired spacing between the cover and the exposed edge.

12. A seal arrangement for a part, the part having an exposed edge, a top surface, and a fay surface opposite the top surface, the seal arrangement comprising:

an edge seal in direct contact with the exposed edge, the edge seal covering the exposed edge and a portion of the top surface;

a cover covering the edge seal, the exposed edge, and another portion of the top surface;

a seal bead configured to form a seal between the fay surface and a structure to which the part is joined; and a recess in the fay surface or in a portion of the cover positioned in a notch in the fay surface, wherein the seal bead is located in the recess.

13. The seal arrangement of claim 12, wherein the edge seal is a precured polymer.

14. The seal arrangement of claim 12, wherein the seal bead has a cross-sectional area that is greater than a cross-sectional area of the recess, such that a portion of the seal bead extends outside of the recess and is forced between the cover and the structure when the part is joined to the structure.

15. The seal arrangement of claim 12, wherein the recess is in the portion of the cover positioned in the notch in the fay surface and the notch in the fay surface is adjacent the exposed edge.

16. The seal arrangement of claim 12, wherein the cover overlaps the top surface, the exposed edge, and the fay surface.

17. The seal arrangement of claim 12, wherein the cover includes standoffs configured to engage the exposed edge and maintain a desired spacing between the cover and the exposed edge.

18. An edge seal arrangement for sealing an exposed edge of a composite laminate part, comprising:

a polymer edge seal in direct contact with the exposed edge and covering the exposed edge and a portion of a top surface of the composite laminate part;

a cover protectively covering the polymer edge seal, the exposed edge, and another portion of the top surface of the composite laminate part, wherein the composite laminate part has a fay surface opposite the top surface, the fay surface configured to be joined to a structure;

a recess in the fay surface or in a portion of the cover positioned in a notch in the fay surface; and a seal bead located within the recess, the seal bead being configured to form a seal between the fay surface and the structure.

19. The edge seal arrangement of claim 18, wherein:

the edge seal arrangement is configured to be integrated into the composite laminate part before the part is joined with the structure.

20. The edge seal arrangement of claim 18, wherein:

the recess is in the portion of the cover positioned in the notch in the fay surface;

a portion of the polymer edge seal extends into the notch; and the cover extends into the notch and covers the portion of the polymer edge seal.

21. The edge seal arrangement of claim 18, wherein the cover includes standoffs configured to engage the exposed edge and maintain a desired spacing between the cover and the exposed edge.

22. The edge seal arrangement of claim 18, wherein the seal bead includes a portion extending outside of the recess such that the portion extending outside of the recess is forced to flow between the fay surface and the structure when the part is joined to the structure.

23. A method of joining a fay surface of a part having an exposed edge with a structure, comprising:

applying an edge seal directly on the exposed edge of the part, the edge seal covering the exposed edge and a portion of a top surface of the part opposite the fay surface;

installing a cover over the edge seal, the exposed edge, and another portion of the top surface;

forming a recess in the fay surface of the part or in a portion of the cover positioned in a notch in the fay surface of the part;

placing a seal bead in the recess; and bringing the fay surface of the part into contact with the structure, including forming a seal between the fay surface of the part and the structure using the seal bead.

24. The method of claim 23, wherein bringing the fay surface of the part into contact with the structure includes forming a seal between the cover and the structure using the seal bead.

25. The method of claim 23, wherein forming a seal between the fay surface of the part of the structure includes spreading the seal bead by squeezing the seal bead between the fay surface of the part and the structure.

26. The method of claim 23, wherein the seal bead is configured to spread as the fay surface of the part is brought into contact with the structure.

27. The method of claim 23, further comprising:

trimming the cover to a desired size after the cover has been installed on the exposed edge.

28. The method of claim 23, further comprising:

curing the edge seal and the seal bead.

29. The method of claim 28, wherein curing the seal bead is performed after the bringing the fay surface of the part into contact with the structure.

30. A method of joining a fay surface of a part having an exposed edge with a structure, comprising:

applying an edge seal on the exposed edge of the part, the edge seal covering the exposed edge and a portion of a top surface of the part opposite the fay surface;

installing a cover over the edge seal, the exposed edge, and another portion of the top surface;

applying a top seal at the junction between an upper leg of the cover and the top surface of the part;

forming a recess in the part adjacent the fay surface;

placing a seal bead in the recess; and bringing the fay surface of the part into contact with the structure, including forcing at least a portion of the seal bead along an interface between the fay surface and the structure.

31. The method of claim 30, wherein forming a seal between the fay surface of the part and the structure includes forcing the seal bead into a gap between the cover and the structure.

32. A seal arrangement for a part configured to be joined to a structure, the part having an exposed edge, a top surface, and a fay surface opposite the top surface, the seal arrangement comprising:

an edge seal in contact with the exposed edge, the edge seal covering the exposed edge and a portion of the top surface;

a cover covering the edge seal, the exposed edge, and another portion of the top surface;

a recess adjacent the fay surface;

a seal bead located within the recess and configured to form a seal between the fay surface and the structure to which the part is joined; and a top seal applied at the junction between an upper leg of the cover and the top surface of the part.

33. A seal arrangement for a part configured to be joined to a structure, the part having an exposed edge, a top surface, and a fay surface opposite the top surface, the seal arrangement comprising:

an edge seal in contact with the exposed edge, the edge seal covering the exposed edge and a portion of the top surface;

a cover covering the edge seal, the exposed edge, and another portion of the top surface;

a recess adjacent the fay surface;

a seal bead located within the recess and configured to form a seal between the fay surface and the structure to which the part is joined; and a fay surface seal applied to the fay surface and the seal bead.

* * * * *